Sept. 8, 1925.
E. H. ANGLE
1,552,413
ORTHODONTIC APPLIANCE
Filed March 3, 1925
FIG. 1.
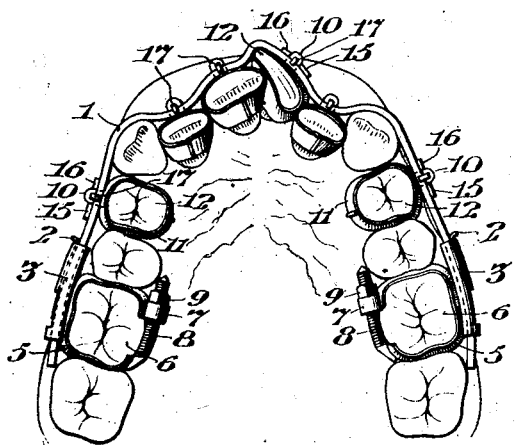
FIG. 3.
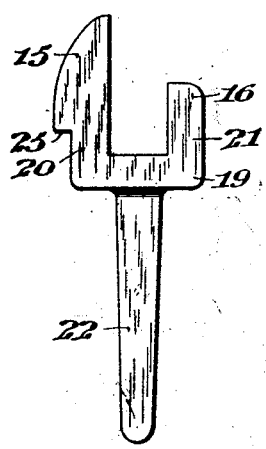
FIG. 2.
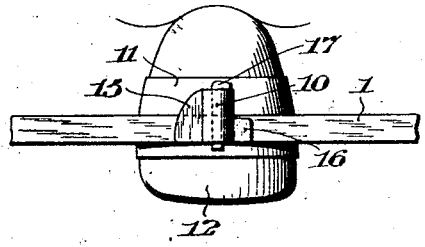
FIG. 4.
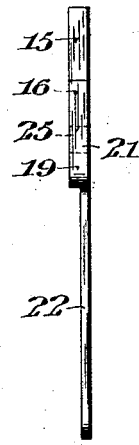
FIG. 5.      FIG. 6.      FIG. 7.
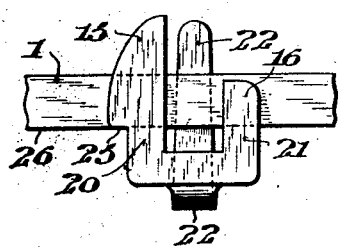 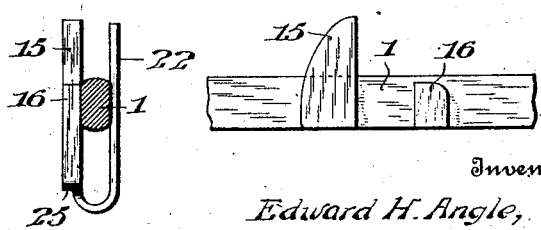
Inventor
Edward H. Angle,
By Clifton C. Hallowell
Attorney Patented Sept. 8, 1925.

1,552,413

UNITED STATES PATENT OFFICE.

EDWARD H. ANGLE, OF PASADENA, CALIFORNIA.

ORTHODONTIC APPLIANCE.

Application filed March 3, 1925. Serial No. 12,827.

*To all whom it may concern:*

Be it known that I, EDWARD H. ANGLE, a citizen of the United States, and a resident of Pasadena, in the county of Los Angeles, State of California, have invented certain new and useful Improvements in Orthodontic Appliances, of which the following is a specification, reference being had to the accompanying drawings.

Broadly speaking, my invention relates to dental devices that are adapted for the movement of malposed teeth into their relatively normal positions in the dental arch, and particularly to such devices in which an arch-bar is employed with its terminals suitably supported for adjustment in anchorages clamped to suitably disposed posterior teeth, and connected intermediate of its terminals with brackets projecting from tooth-bands secured to selected malposed teeth of the dental arch, and is especially directed to the means by which rigid connection between said tooth-band brackets on the malposed teeth, and the arch-bar may be effected.

The principal objects of my invention are to provide an arch-bar with abutments so spaced as to engage the opposite sides of a tooth-band bracket, and so formed as to insure such a rigid connection therewith as to afford a positive movement of the connected tooth bodily or effect its rotation about its axis, or the lateral tipping of said axis with equal facility.

Other objects of my invention are to so form the abutments to be attached to the arch-bar, that they may be readily adjusted on said arch-bar with precision and rigidly held in such adjusted position as to greatly facilitate their integral attachment thereto.

My invention comprehends an arch-bar having tooth-band bracket abutments comprising parallel bars arranged to embrace said bracket and respectively fit snugly against its opposite sides, being of relatively different length, the one serving as a lever bearing substantially throughout the extent of said bracket, while the other serves to maintain said lever in intimate contact with said bracket, and together being cooperative to not only effect the movement of the tooth bodily in the direction of the length of said arch-bar, but to maintain a rigid and stable relation to the bracket and arch-bar, thus preventing any tendency of said bracket to tip relative to said arch-bar.

Specifically stated, the form of my invention as hereinafter described, comprises a cleat bifurcated to form prongs having opposed parallel edges, and provided with a tang arranged to be bent back into cooperative relation with said prongs to afford a clamp by which said cleat may be frictionally engaged with the arch-bar, said cleat being arranged to straddle said arch-bar with the prongs and tang respectively engaging its opposite sides.

My invention also includes all of the various novel features of construction and arrangement as hereinafter more definitely specified.

In the accompanying drawings, Figure 1 is an inverted plan view of the upper human dental arch showing a convenient embodiment of my invention attached to the arch-bar and associated with the brackets of tooth-bands on selected malposed teeth of said dental arch; Fig. 2 is an enlarged front elevational view of one of the incisor teeth showing my invention applied thereto in operative and ultimate form; Fig. 3 is a greatly enlarged front elevational view of the cleat constructed in accordance with my invention, as it appears in its manufactured or initial form; Fig. 4 is a side elevational view of the cleat structure illustrated in Fig. 3; Fig. 5 is a front elevational view of the cleat shaped to form a clamp and embracing an arch-bar in position to be soldered thereto; Fig. 6 is a side elevational view of the structure as assembled in Fig. 5, the arch-bar being shown in section for convenience of illustration; and Fig. 7 is a front elevational view similar to that illustrated in Fig. 5, but showing the cleat trimmed flush with the edge of the arch-bar thereby leaving the soldered prongs of said cleat in position to provide the abutments for the bracket as illustrated in Fig. 2.

The tooth regulating appliance to which this invention is especially applicable is indicated in a general way in Fig. 1, and includes, together with associated parts, an arch-bar 1 bent to substantially conform to the dental arch and having its extremities provided with tangs 2 and extended through anchor sheaths 3, with which said tangs may be engaged to retain the arch-bar 1 in adjusted position, and which are carried by the anchor-bands 5, of well known construction.

As shown in Fig. 1, the anchor bands 5 are attached to the first molar teeth 6, which serve as anchor abutments upon opposite sides of the dental arch, said bands being provided with an eye 7 at one end, and at the other end, a threaded stem 8 extended through said eye and arranged to be adjusted therein by the nut 9 to clamp the band 5 upon said abutment teeth 6, as is obvious.

The gist of my invention is the provision of conveniently applied means for preventing the relative longitudinal movement of the arch-bar 1, in the bracket 10 of the tooth-band 11 secured to selected malposed teeth 12 of the dental arch as indicated in Fig. 1, and, as best shown in Fig. 2, said means comprises the abutments 15 and 16, which are attached to the arch-bar 1, preferably by solder, with their opposed edges in such parallel relation, as to embrace and closely engage the opposite sides of said bracket 10, said arch-bar 1 being prevented from lateral displacement by the retaining pin 17.

It may be here noted that the abutment 15 extends substantially the full length of the bracket 10 and affords a lever by which a tilting force applied to the arch-bar 1 tends to rock the axis of the tooth 12 laterally, while the abutment 16 is comparatively short, extending only substantially the width of the arch-bar 1, and serving to maintain the operative edge of the abutment 15 in cooperative engagement with said bracket 10.

In order to insure the proper positioning of the abutments 15 and 16 on the arch-bar in a definitely spaced parallel relation, and to properly and conveniently retain them in such position while being secured to said arch-bar, they are preferably formed from a unitary structure comprising the cleat 19, as shown in Figs. 3 and 4.

The cleat 19 is provided with the prongs 20 and 21 forming the abutments 15 and 16, and has the tang 22 preferably of a reduced thickness, as clearly shown in Fig. 4, arranged to be bent backwardly into cooperative relation with said prongs 20 and 21 to form a clamp arranged to embrace and tightly grip the arch-bar 1, as clearly shown in Figs. 5 and 6, and so engage it on said arch-bar as to greatly facilitate the soldering operation by which said prongs 20 and 21 may be secured to the arch-bar 1 to form the abutments 15 and 16.

As shown in Figs. 3 and 5, the clamp is provided with the shoulder 25, preferably formed on the prong 20, and serving as a guide by which the vertical position of the cleat 19 may be determined, by registering said shoulder 25 with the edge 26 of the arch-bar 1.

After the cleat 19 has been properly adjusted on the arch-bar 1 in the required position and the prongs 20 and 21 soldered or otherwise integrally attached to the arch-bar, as indicated in Figs. 5 and 6, said prongs may be severed flush with the edge 26 of said arch-bar 1, thereby leaving the abutments 15 and 16 on said arch-bar, as shown in Fig. 7, with their opposed edges so disposed and relatively spaced, as to closely engage the opposite sides of the bracket 10, when said arch-bar is fitted in said bracket and secured by the pin 17, as best shown in Fig. 2.

To properly locate the cleat 19 on the arch-bar the latter is scribed transversely just anterior to the bracket 10 attached to the tooth-band, and the cleat having its tang bent to form the clamp is slipped on the arch-bar, and the inner edge of its anterior prong made to register with the transverse scribe corresponding to the side of the bracket 10, and the shoulder 25 caused to register with the edge 26 of said arch-bar. While thus held by the tang 22, the prongs 20 and 21 may be soldered to the arch-bar 1, and the surplus or unattached clamp portion severed, thereby leaving the abutments 15 and 16 in operative position to engage said bracket 10.

My invention is advantageous in that absolute accuracy is attained in positioning the abutments, without bringing to bear any great effort and superior skill on the part of the operator.

I do not desire to limit my invention to the precise details of construction and arrangement as herein specified, as it is obvious that various modifications may be made therein without departing from the essential features of my invention as defined in the appended claims.

Having thus described my invention, I claim:

1. An orthodontic appliance comprising a cleat having relatively spaced prongs arranged to provide abutments on an arch-bar, and having a tang cooperative with said prongs to clamp said cleat on said arch-bar.

2. An orthodontic appliance comprising a cleat having relatively spaced prongs arranged to provide abutments on said arch-bar, affording opposed parallel edges, and having a tang cooperative with said prongs to provide a clamp arranged to embrace said arch-bar and frictionally engage said cleat therewith.

3. An orthodontic appliance comprising a cleat having relatively spaced prongs arranged to provide abutments on an arch-bar, between which the bracket of a tooth-band may be engaged, and having a pliant tang extended into cooperative relation with said prongs to clamp said cleat on said arch-bar while being permanently secured thereto.

4. An orthodontic appliance comprising a bifurcated structure having a tang, the prongs of which afford relatively spaced parallel edged abutments on an arch-bar, and the tang being cooperative with said prongs to frictionally engage said structure with said arch-bar while said prongs are being permanently secured thereto.

5. An orthodontic appliance comprising a bifurcated structure having a tang, the prongs of which afford relatively spaced parallel edged abutments of relatively different extent on an arch-bar, and the tang being cooperative with said prongs to frictionally engage said structure with said arch-bar while said prongs are being permanently secured thereto.

6. An orthodontic appliance comprising a bifurcated structure having a tang, the prongs of which are arranged to be permanently secured to an arch-bar and affording abutments having relatively parallel spaced opposed edges extended transversely across the side of said arch-bar, between which the bracket of a tooth-engaging-band may be snugly engaged, and the tang being relatively thinner than said prongs serving as a clip arranged to clasp said structure to said arch-bar while being permanently engaged to form said abutments.

7. An orthodontic appliance comprising a bifurcated structure affording relatively spaced prongs, and a tang cooperative to form a clamp arranged to be frictionally engaged with an arch-bar to provide abutments thereon.

8. An orthodontic appliance comprising a bifurcated structure affording relatively spaced prongs of relatively different longitudinal extent, and a tang cooperative to form a clamp arranged to be frictionally engaged with an arch-bar to provide abutments thereon.

9. An orthodontic appliance comprising a bifurcated structure affording relatively spaced prongs, a tang cooperative to form a clamp arranged to be frictionally engaged with an arch-bar to provide abutments thereon, and a shoulder forming a guide for gauging the position of said structure on said arch-bar.

In witness whereof, I have hereunto set my hand this 24th day of February, A. D., 1925.

EDWARD H. ANGLE.